US008857102B2

(12) United States Patent
Weisberg et al.

(10) Patent No.: US 8,857,102 B2
(45) Date of Patent: Oct. 14, 2014

(54) RODENT TRAP

(75) Inventors: Gary B Weisberg, Gloucester, MA (US); Barry Franks, Jr., Derry, NH (US)

(73) Assignee: Gary B. Weisberg, Gloucester, MA (US)

( * ) Notice: Subject to any disclaimer, the term of this patent is extended or adjusted under 35 U.S.C. 154(b) by 783 days.

(21) Appl. No.: 12/405,917

(22) Filed: Mar. 17, 2009

(65) Prior Publication Data

US 2009/0229169 A1 Sep. 17, 2009

Related U.S. Application Data

(60) Provisional application No. 61/037,202, filed on Mar. 17, 2008.

(51) Int. Cl.
*A01M 23/16* (2006.01)
*A01M 23/18* (2006.01)
*A01M 23/08* (2006.01)

(52) U.S. Cl.
CPC ................................. *A01M 23/08* (2013.01)
USPC ...................................... 43/67; 43/61; 43/65

(58) Field of Classification Search
USPC .................................. 43/61, 64, 65, 67, 69, 70
See application file for complete search history.

(56) References Cited

U.S. PATENT DOCUMENTS

| | | | | |
|---|---|---|---|---|
| 1,108,724 A * | 8/1914 | Draper et al. | ...................... | 43/76 |
| 1,715,445 A * | 6/1929 | Baum | ................................ | 43/76 |
| 2,195,484 A * | 4/1940 | George | ............................. | 43/76 |
| 2,225,251 A * | 12/1940 | Andrick | ............................. | 43/61 |
| 2,481,907 A * | 9/1949 | Cook | ................................ | 43/67 |
| 2,562,313 A * | 7/1951 | Hickson | ............................ | 43/67 |
| 2,573,759 A * | 11/1951 | Blatchford | ........................ | 43/76 |
| 2,587,349 A * | 2/1952 | Mace | ................................ | 43/67 |
| 2,599,711 A * | 6/1952 | Hembree | .......................... | 43/67 |
| 2,916,847 A * | 12/1959 | Murphy | ............................. | 43/61 |
| 4,103,448 A * | 8/1978 | Souza | ................................ | 43/67 |
| 4,144,667 A | 3/1979 | Souza | | |
| 4,151,673 A * | 5/1979 | Campbell | ......................... | 43/67 |
| 4,468,883 A | 9/1984 | Williams | | |
| 5,471,781 A | 12/1995 | Vine | | |
| 5,611,171 A | 3/1997 | Hershey | | |
| 6,272,789 B1 * | 8/2001 | Huang | ............................... | 43/58 |
| 6,481,151 B1 * | 11/2002 | Johnson et al. | ................... | 43/69 |
| 6,631,582 B2 * | 10/2003 | Knuppel et al. | .................. | 43/69 |
| 6,691,452 B1 * | 2/2004 | Knuppel et al. | .................. | 43/69 |
| 6,865,843 B1 | 3/2005 | Jordan, Sr. | | |
| 7,216,457 B1 | 5/2007 | Hanning, Jr. | | |
| 7,231,738 B2 | 6/2007 | Watson et al. | | |
| 2004/0025410 A1 * | 2/2004 | Shapland | .......................... | 43/65 |

FOREIGN PATENT DOCUMENTS

CA 2487653 5/2005

* cited by examiner

*Primary Examiner* — David Parsley
(74) *Attorney, Agent, or Firm* — Maine Cernota & Rardin

(57) ABSTRACT

One embodiment of the present invention provides a rodent proofing and entrapment system, the system comprising: a rodent proof shell; a opening disposed in the shell communicating with a rodent passage; a bridge having a proximal end disposed proximate to the first opening and a distal end disposed proximal to a trap chamber, the bridge being configured to pivot on a pivot axis; a door, engaged by the proximal end of the bridge, such that when a rodent crosses the pivot axis towards the distal end of the, the door closes; a flap depending from the distal end of the bridge excluding rodent access beneath the bridge and closing the trap chamber when the distal end of the bridge is in an upright position.

8 Claims, 6 Drawing Sheets

RODENT TRAP

RELATED APPLICATIONS

This application claims the benefit of U.S. Provisional Application No. 61/037,202, filed Mar. 17, 2008. This application is herein incorporated in its entirety by reference.

FIELD OF THE INVENTION

The invention relates to traps, and more particularly, to a rodent trap.

BACKGROUND OF THE INVENTION

Most traps on the market today are either single catch devices, for example snap traps or others are multi catch for example, wind up devices and or devices which rely upon a one way door such as the "Tin Cat." All the traps in the industry rely on proper placement in order to be effective.

The placement of these traps is primarily along floor surfaces next to the wall and along the rodents' runway. With a common glue board a mouse will run the wall until he gets to the glue trap and then will either get stuck or will go around the trap and avoid being caught. With the mechanical traps a mouse will run the wall till he finds a hole normally located on the side or ends of the trapping device. The mouse may enter the trap or will frequently go around or jump over the device. With a wind up multiple ketch trap such as the "Ketch All" or Mouse Master" the devices are frequently over wound or sprung resulting in a disabled trap. All other traps e.g. snap trap, glue trap wind up or passive one-way door multi-catch traps rely upon crucial placement in order to be effective and once moved out of place, these traps cease to be effective. These devices are constantly being moved out of place, by virtue of the fact that they are not affixed. Once out of place the device's ability to catch mice is severely compromised. These devices are further limited by virtue of the fact that they are conspicuous in public places due to their design and appearance.

SUMMARY OF THE INVENTION

One embodiment of the present invention provides a rodent proofing and entrapment system, the system comprising: a rodent proof shell; a opening disposed in the shell communicating with a rodent passage; a bridge having a proximal end disposed proximate to the first opening and a distal end disposed proximal to a trap chamber, the bridge being configured to pivot on a pivot axis; a door, engaged by the proximal end of the bridge, such that when a rodent crosses the pivot axis towards the distal end of the ramp, the door closes; a flap depending from the distal end of the bridge excluding rodent access beneath the bridge and closing the trap chamber when the distal end of the bridge is in an upright position.

Another embodiment of the present invention provides such a system wherein the trap chamber communicates with a central vacuum source.

A further embodiment of the present invention provides such a system wherein the shell runs the length of a wall proximal to which the system is installed.

Yet another embodiment of the present invention provides such a system wherein the opening faces the wall.

A yet further embodiment of the present invention provides such a system wherein the opening faces an interior of a room in which the system is installed.

Even another embodiment of the present invention provides such a system wherein the trap chamber is disposable.

An even yet further embodiment of the present invention provides such a system further comprising a rodent run path disposed within the system such that the rodent run path directs rodents from a plurality of entrances to the trap chamber.

A still further embodiment provides such a system, wherein the trap chamber is configured to be evacuated.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
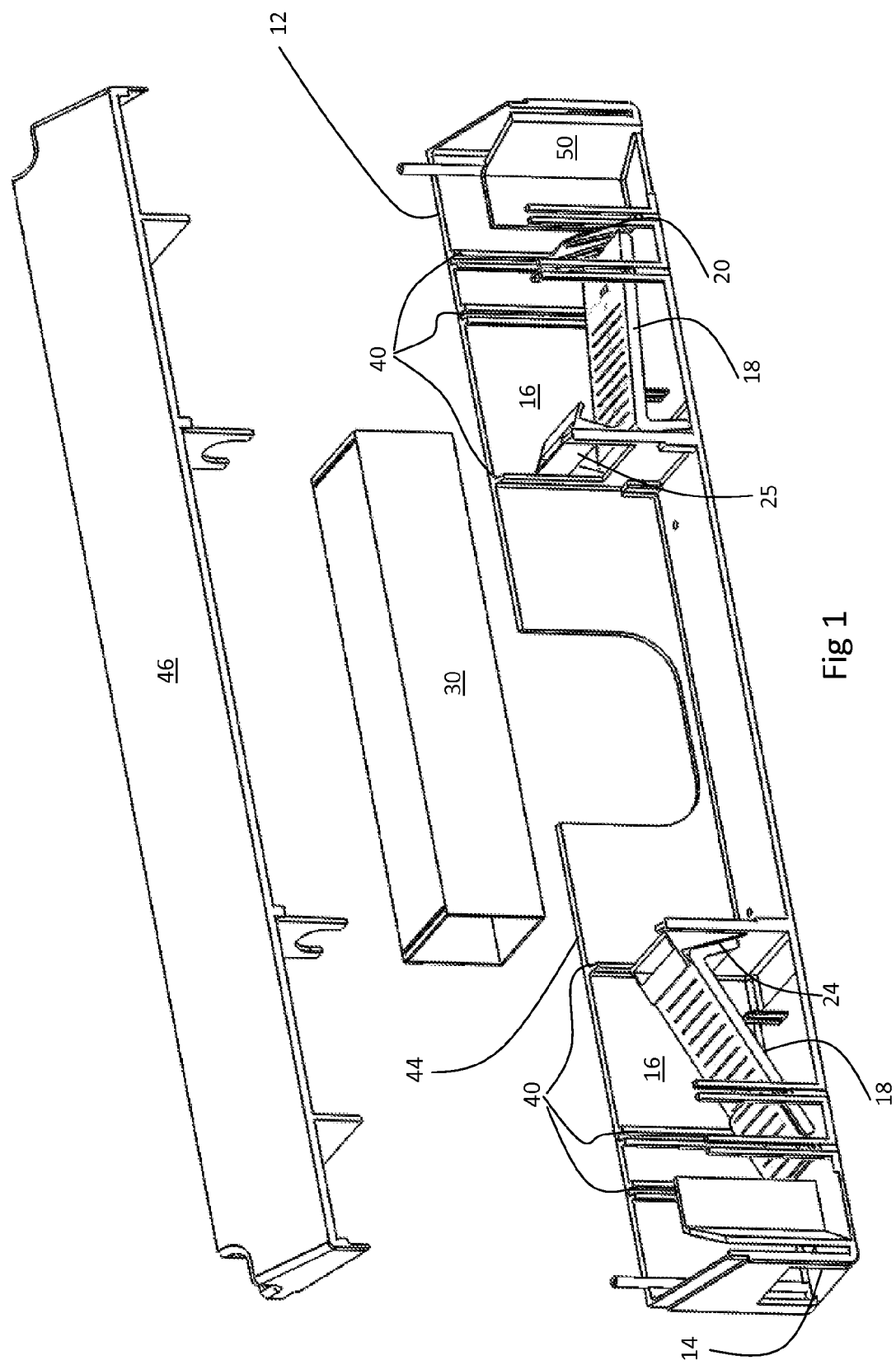
FIG. 1 is an exploded perspective drawing illustrating a rodent trap with a disposable trap configured in accordance with one embodiment of the present invention.

One embodiment of the present invention provides a rodent trap configured for the more effective capture and removal of rodents from an interior of a building. In one such embodiment, the trap is configured to be permanently installed along interior and or exterior walls of a room or building. In alternative embodiments, it can be installed in basements high on the wall secured to the ceiling, or basement sill ledge. In such embodiments, it is configured to be secured in position and does not require movement and resists accidental displacement.

In one such embodiment, an internal catch mechanism is provided and the exterior of the trap proximal to the inhabited part of the room in which it is disposed is configured to appear like a baseboard radiator or similar installed device. In such an embodiment, a rodent proof cover is provided extending the length of the wall covering the trap mechanism and preventing rodent bypass of the trap opening. This accomplishes two purposes: rodent trapping and rodent proofing. The rodent proof shell covers any holes disposed in the wall which would otherwise permit entrance or egress by rodents. By blocking the holes with a material resistant to gnawing or clawing, the interior walls of a building are rodent proofed.

Similarly, rodents in the walls, entering from outside, or already living in the walls at the time of installation, attempting to exit the wall into the room and forage for food within the residence, industrial or commercial establishment will find their passage to the room is blocked by the continuous shell of the trap. The shell of one embodiment of the present invention directs the rodent to the trap mechanism facilitating capture. Such a rodent then finds itself on the inside of the shell and the only way out is through the ramp bridge into the trapping center.

In one such embodiment, corresponding rodent collection paths are made from the room interior to the trapping center through holes disposed in the rodent proof shell. If outside the shell, mice or other rodents will enter the trap through a series of such openings in the shell leading to a ramp and one way door which prevents them from exiting the trap.

Once a rodent enters the trapping center, of such an embodiment, it enters the ramp bridge section and is trapped by a one way door. In one embodiment, once inside, mice will be quickly removed to a central trapping station via a vacuum system. It is anticipated the central vacuum system will be the cleanest and most sanitary means for the immediate removal of the rodents and eliminates the need for direct handling of rodents. In the maintenance system the rodents will be channeled to one or more removable collection traps. Such traps may be disposable or cleanable One embodiment of the present invention is configured to receive and trap mice entering the trap from the room and mice entering the trap from the wall.

One skilled in the art will appreciate that the present invention is susceptible to many embodiments, and is not limited to specific dimensions. The rodent proof shell, for instance, may be configured in a variety of sizes depending on the specific requirements of the installation, from complete encircling of a room, to a more limited installation. Some embodiment shells will stand alone or may also be connected. The shells size may also vary ranging from very small to possibly and entire wall covering shell device.

In one embodiment, a downward flap extending downward from the trap bridge is provided in the trap center assembly. Many known trap design utilize a seesaw configuration. Most, such known traps have two bridges facing each other. It has been observed however, that a rodent entering such a trap climbs up the bridge and the bridge lowers till it hits the floor. A rodent trapped in such a design may become lodged under the bridge member, locking the bridge member in an upright position, effectively disarming the trap mechanism. A downward flap blocks the area, preventing the trapped rodent from becoming lodged in the area beneath the bridge.

In one embodiment of the present invention illustrated in FIG. 3-6, a vacuum trap utilizes a shell 12 to give an external appearance of a floor mount radiator or other plumbing system. Along the exterior of the shell is a rodent hole 14. This enticing hole leads into the bridge box 16 to a pivoting bridge 18 or one way door. As the mouse or other rodent climbs the bridge 18 the bridge 18 seesaws causing a back trap door 20 to flip up and close off the rodents path of retreat. The front face of the bridge 18 has an elongated downward flange 20. This downward flange 24 is controls the downward movement of the bridge 18 and covers the passage door 25 when disposed in a resting position. As the bridge 18 pivots the back door 20 is shut and the bridge levels itself, thus exposing the passage door 25 in this system the rodent moves through the door 25 and leaves the bridge box 16. The rodent has entered, in one embodiment, a Vacuum chamber 26. As the mouse leaves the bridge box 16 the bridge 18 pivots up and the flange 24 covers the passage door 25. Closure of the door 25 by the flange 24 facilitates evacuation of the vacuum chamber 26. The vacuum connector or chamber 26 can connect one or multiple bridge boxes 16 to a central vacuum system (Not shown) via a pipe or run 28. Once a rodent enters inside the vacuum chamber 26 the central vacuum system is triggered and evacuates the rodent through the pipes 28 and into a central containment area (Not shown). In such an embodiment, the central vacuum system may be triggered by a timer, manually, or by a sensor.

Figure 2:
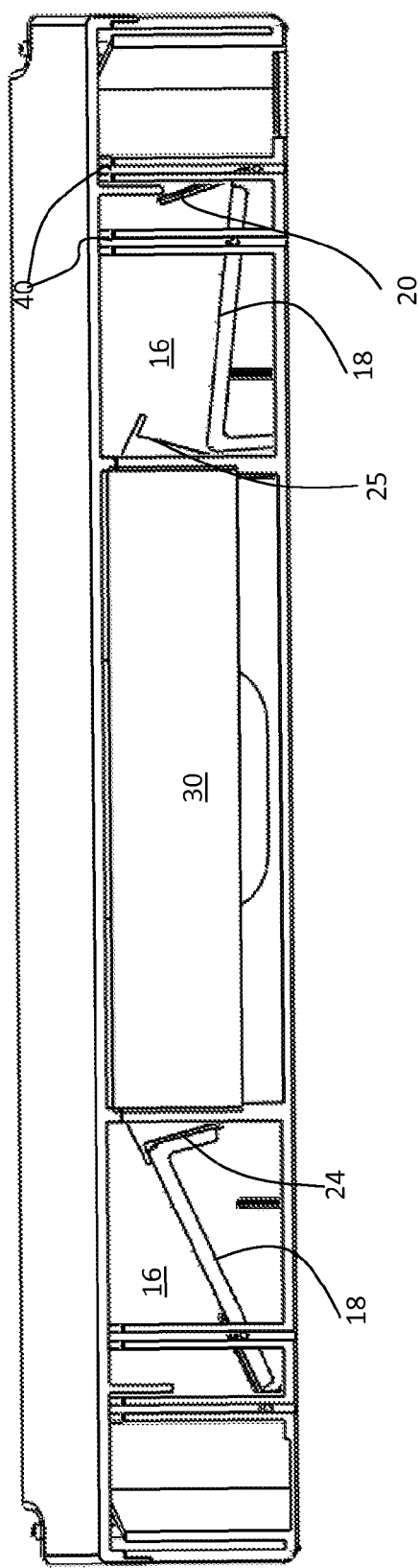
FIG. 2 is a front elevation drawing illustrating a rodent trap with a disposable trap configured in accordance with one embodiment of the present invention.
Figure 3:
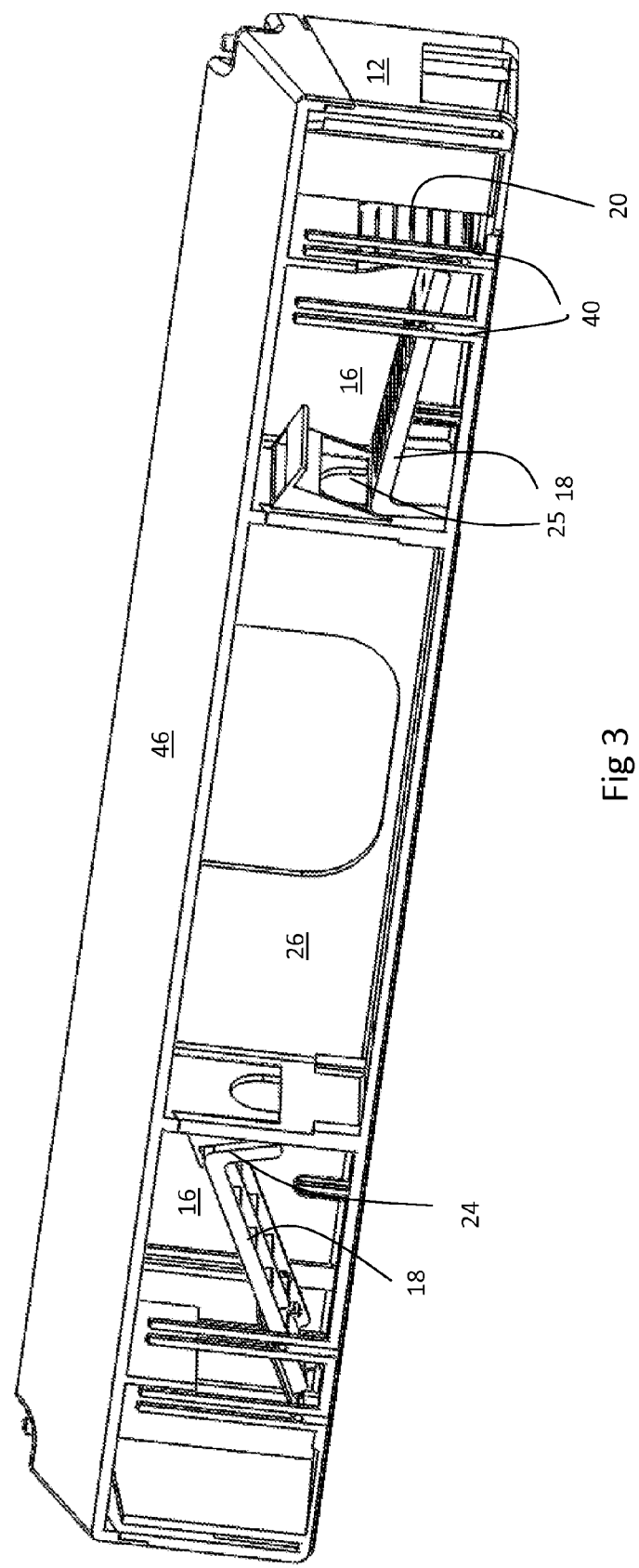
FIG. 3 is a perspective drawing illustrating a rodent trap with a vacuum trap configured in accordance with one embodiment of the present invention.

In one such embodiment illustrated in FIGS. 1-2, a shell 12 is provided with an external appearance of a floor mount radiator or other plumbing system. Along the exterior of the shell 12 is a rodent entrance hole 14. This hole leads into the Bridge box 16 to a pivoting ramp or bridge 18. As the mouse climbs the bridge 18 the bridge 18 pivots causing the back Trap Door 20 to flip up and close off the exit. A flap or flange 24 is dependant from the distal end of the bridge 18, proximal to a passage door 25. Through this passage door 25, the rodent enters, becoming trapped in a disposable trap 30 as the bridge pivots to its original position and the flap 24 closes the door 25. The removable trapping device 30 can connect to one or multiple bridge boxes 16. A service technician or other user may periodically examine the removable trap by opening a maintenance cover 32 and removing the trap 30 and cleaning and or replacing.

Various embodiments of the present invention may be provided wherein the components of the invention may be manufactured from different materials, including by but not limited to metal, plastic and resin. Components may be molded or manufactured from sheet materials. In molded embodiments, illustrated in FIGS. 1-5, the bridge box 16 could be configured as a run or a channel for mice and other rodents to enter to get to the pivotal bridge or ramp 18 and trap door 24. In this design the front of the shell 12 would also act as the side of the bridge box 16 and the secondary internal wall 38 would act as the corresponding bridge box internal, or run, or channeling wall 16. The interior of the front shell 12 could have indented slots 40 as well as the corresponding parallel secondary wall spaced a necessary distance to allow a user defined rodent channel by mean of replaceable inserts or drop ins. These slots 40 would allow for drop-ins of the bridge 18, trap door 20, face plate 24 and the trap door catch.

One such embodiment the secondary wall 42 could be taller then the front shell wall 12. This higher secondary wall 42 could be shorter than the back shell wall 44 creating an angled cover allowing the cover to serve as the top of the original bridge box style. A cover 46 would prevent rodents from jumping up and escaping the channeling area. It may also comprise integrate with the structures of the shell to facilitate the mechanisms of the system. The cover need not in all embodiments be angles. In some embodiments, multiple runways may be provided, in such embodiments, multiple openings 14 may be disposed within each runway. On both sides between the front shell wall 12 and the secondary taller wall 42 a divider wall 50 can be placed to keep the rodents on track trough the channel to the trapping mechanism. Once the rodent enters the holes 14 in the shell which can be from the back, front, left and right they ultimately are guided to the pivoting ramp or bridge 18 which triggers the trap door 20 to rise up thereby blocking the path of escape for the rodent. As described in detail above in reference to other embodiments, the ramp or bridge 18 pivots down till it rests on the extended flap, once the ramp/bridge enters this position, the hole is visible in the face plate, exposing the entrance to the trapping area. Once the rodent enters the trapping area, and its weight no longer depresses the ramp, the ramp 18 pivots back to its original position. The ramp/bridge 18 with its dependant flap 24 covers the trap opening the trap door opens back up and the system is ready to catch more. In one such embodiment, a trap cartridge may be provided where a rodent is trapped within the trap cartridge, in one embodiment a glue trap is provided on the interior thereof or the interior of the cartridge is coated with glue. In one such embodiment, the trapping cartridge is a tube having a rectangular cross section. Such an embodiment may include closures whereby a user may close the trap cartridge when removing it for disposal. In an alternative embodiment, a vacuum system may be provided as illustrated in FIG. 1.

There are other ways the internal components of the shell could be constructed. One skilled in the art will appreciate that various alternative embodiments are within the scope of the present invention. In such embodiments, a central run inside the shell which has one or multiple entrance points from the exterior and interior of the shell may be provided. Inside the central run one or more channeling devices may be provided to direct the rodents to at least one collection point In one alternative embodiment, a central vacuum run with connecting bridge boxes and runs which connect in a vertical manner may be provided. In such alternative embodiments, the vacuum connection may be in a variety of positions relative to the trapping chamber such that it communicates to the top of the chamber, the bottom of the chamber or the front, side or back of the chamber.

In another alternative embodiment, bridge boxes may be disposed parallel to the vacuum pipe and have the hole on the bridge box parallel the hole on the vacuum pipe. The bridge, in such an embodiment, has an extended flap on the side facing the bridge box hole and the coordinating vacuum pipe hole. As a rodent travels up the bridge the bridge would pivot and move down grounding out on the extended flap. The bridge would be balanced flat and the hole in the bridge box and vacuum pipe would be exposed. As the rodent passed through the holes the bridge would seesaw up and the flap would close the hole. Such a configuration would provide an air tight seal as the flap completely closes the hole at all angles.

Another embodiment provides a shell with two pieces, comprising a base and an insert shell component, inserted into the base, facilitating removal and cleaning of debris, dirt, etc. In one embodiment of the present invention provides a base of the shell as one part and a corresponding top or cover of the shell. In such an embodiment, interior structures could be molded within the complementary bottom half and top half so as to mate and provided the recited structural and mechanical components such as the run, dividers, door and ramp/bridge. In such an embodiment the base or lower part of the shell may be installed or secured to the floor or wall.

Figure 4:
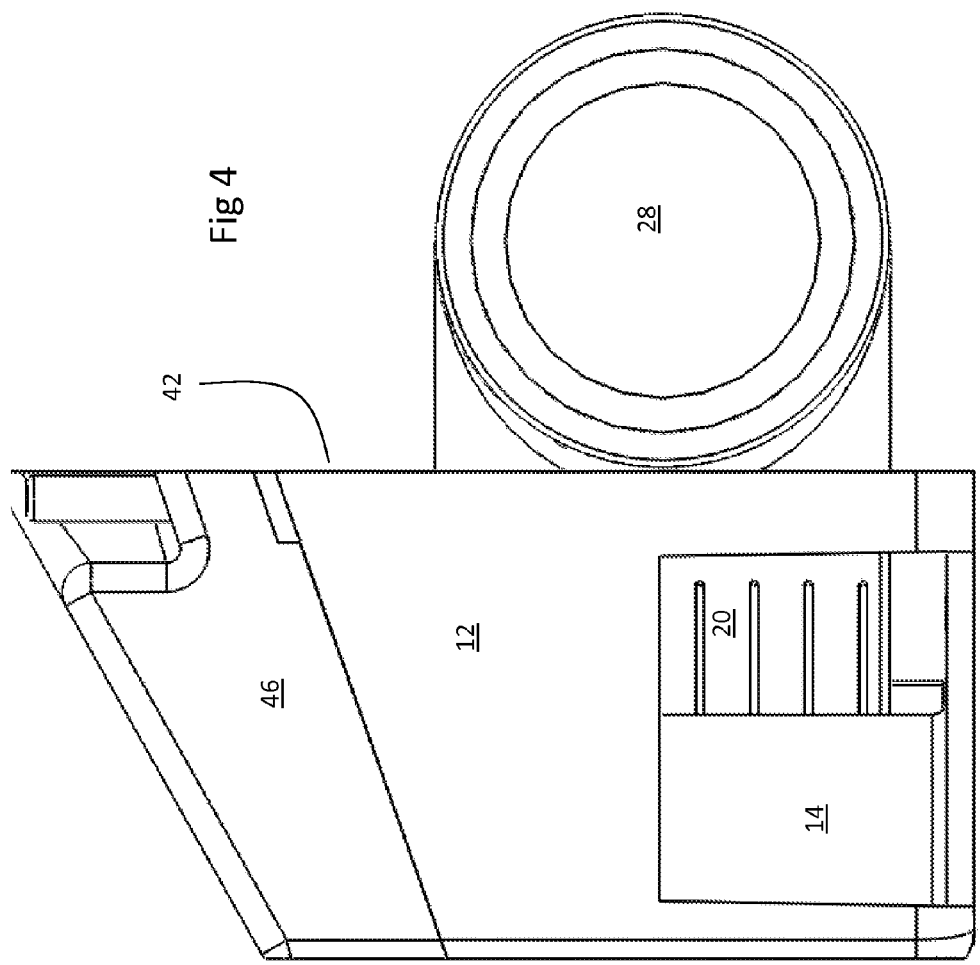
FIG. 4 is a side elevation view illustrating a rodent trap configured in accordance with one embodiment of the present invention and having a vacuum trap.
Figure 5:
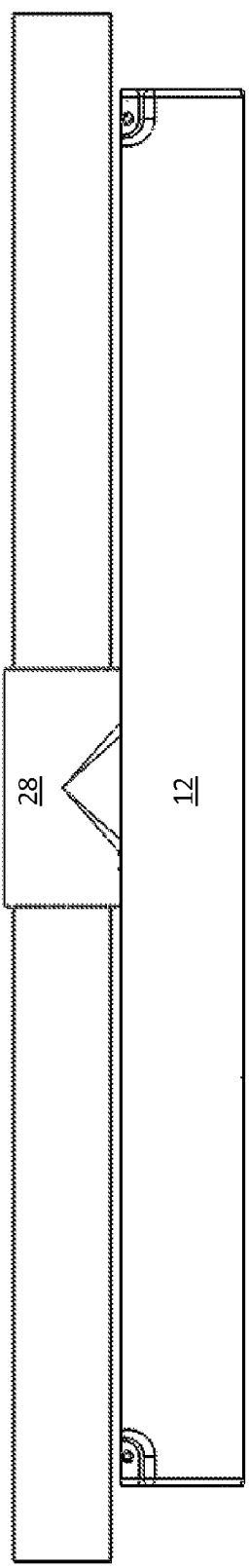
FIG. 5 is a top plan view illustrating a rodent trap configured in accordance with one embodiment of the present invention and having a vacuum trap.
Figure 6:
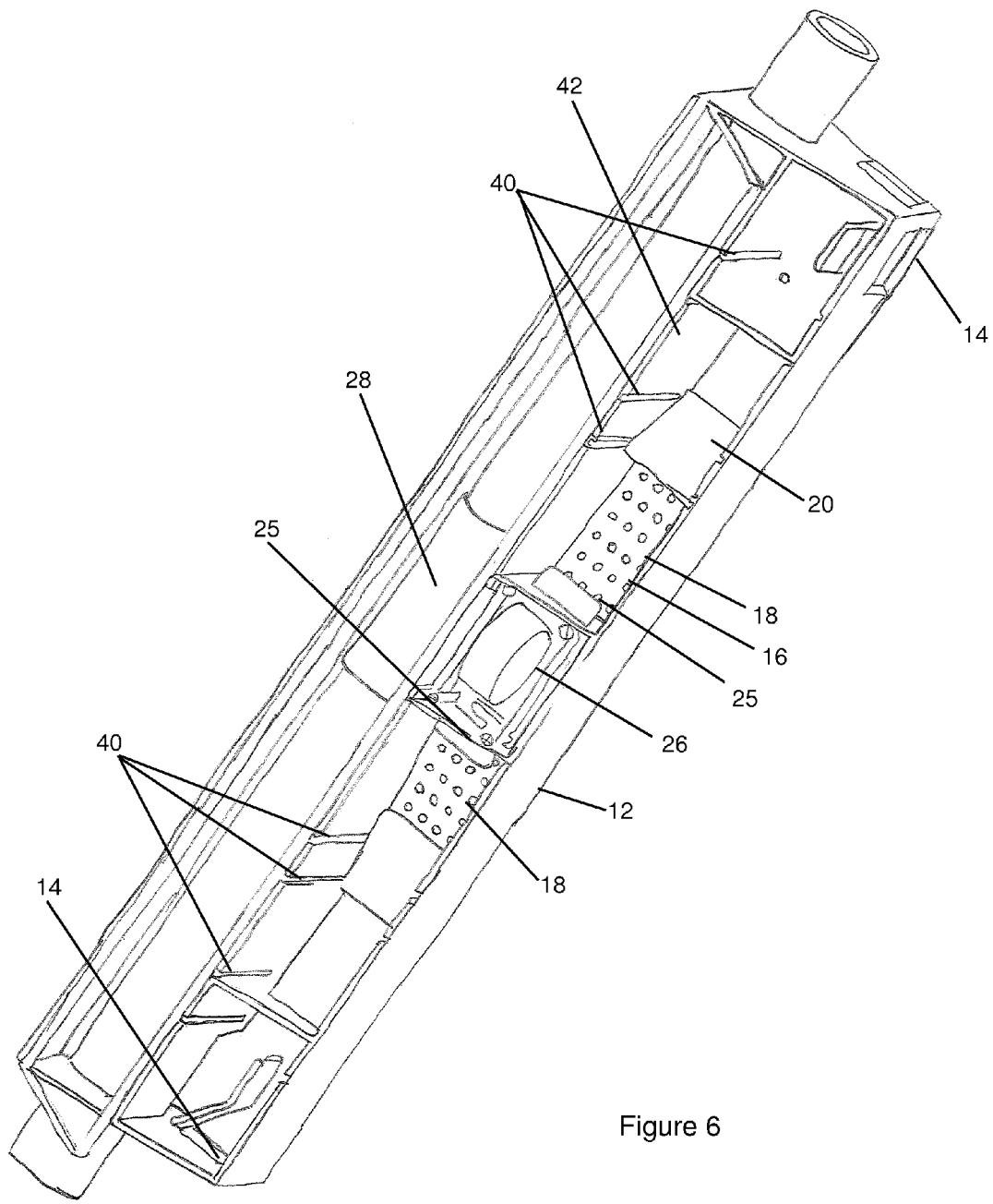
FIG. 6 is a top perspective drawing illustrating a rodent trap with a vacuum trap configured in accordance with one embodiment of the present invention.

In one such embodiment, illustrated in FIG. 4, the shell could be made to couple to an external vacuum system 28 disposed behind the trap. In such an embodiment the vacuum chamber may be directly coupled to the vacuum pipe 28, allowing the animals to enter through the ramp and directly into the evacuation system. Such a chamber may be configured from a T fitting disposed behind the shell of a system configured in accord with such an embodiment.

As a rodent hole could enter from the front or sides as well as the back as from the front, some embodiments of the invention may provide a back insert could for areas where the wall is not the desired height or the shell cannot be mounted flush to the wall.

One skilled in the art will appreciate that the various embodiments of the present invention are not to be limited by the entrance holes in the drawings.

In one embodiment, a connection of a plurality of trapping units separated by spacing panel. The spacing panels may be configured from a rodent resistant material such as plastic, stone, treated or untreated wood, or metal, or such other material as would deter or prevent rodent passage. Properties sought in such materials include but are not limited to durability, resistance to gnawing, aesthetic appearance, chemical properties distasteful or toxic to rodents.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A rodent proofing and entrapment system, said system comprising: a rodent proof shell camouflaged as a baseboard radiator, the rodent proof shell having a top, a bottom, a first end and opposing second, a first shell opening at the first end communicating with a first rodent passage and a second shell opening at the second end communicating with a second rodent passage;
a plurality of bridge box assemblies with at least one bridge box assembly at each end of the shell, each bridge box assembly comprising an entrance opening in communication with a respective rodent passage and an exit opening opposite the entrance opening, a trap door having first extensions pivotally attached to the shell via a first plurality of indented apertures extending between the top and bottom of the shell configured to open and close the bridge box entrance opening, and a pivoting bridge comprising an L-shaped member having a first bridge end and a second bridge end, the bridge having a long wall and a short wall defining a flap, the bridge having second extensions pivotally attached to the shell via a second plurality of indented apertures extending between the top and bottom of the shell, a passage door comprising a downwardly inclined shroud enclosing the bridge box exit opening,
a trap chamber disposed in the shell between the bridge boxes proximate the bridge box exit openings, the trap chamber being disposable and detachable from the shell,
wherein when a rodent enters one of the shell openings and traverses through one of the rodent passages and then traverses one of the pivoting bridges causing the flap to pivot downward opening the respective passage door while contacting the respective trap door to close the respective bridge box entrance opening, as the rodent enters the respective passage door the pivoting bridge pivots in the opposite direction with the flap pivoting upward contacting the passage door to close the passage door and hold the rodent in the trap chamber.

2. The system according to claim 1 wherein said trap chamber is configured to be evacuated.

3. The system according to claim 2 wherein said trap chamber communicates with a central vacuum source.

4. The system according to claim 1 wherein said shell is between 18 and 48 inches in length.

5. The system according to claim 1, wherein at least one shell opening faces a wall.

6. The system according to claim 1, wherein at least one shell opening faces an interior room in which the system is installed.

7. The system according to claim 1, wherein the trap chamber has an adhesive disposed therein.

8. The system according to claim 1 wherein said system is configured to be permanently affixed proximal to a wall using chemical or mechanical fasteners.

* * * * *